United States Patent
Kaplan et al.

(10) Patent No.: US 6,993,011 B1
(45) Date of Patent: Jan. 31, 2006

(54) USER COMMUNICATION HUB FOR USE WITH AN ANALOG PHONE LINE

(75) Inventors: Martin Joseph Kaplan, Olathe, KS (US); Frank Anthony DeNap, Overland Park, KS (US); John Arndt Strand, III, Leavenworth, KS (US); William Lee Edwards, Overland Park, KS (US); Bryan Lee Gorman, Mission, KS (US); Murat Bog, Kansas City, MO (US); Michael Thomas Swink, Lenexa, KS (US); Harold Wayne Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 699 days.

(21) Appl. No.: 09/650,984

(22) Filed: Aug. 30, 2000

Related U.S. Application Data

(63) Continuation of application No. 08/826,641, filed on Apr. 4, 1997, now Pat. No. 6,141,339.

(51) Int. Cl.
*H04L 12/66* (2006.01)
(52) U.S. Cl. .................. 370/352; 370/395.1; 370/466
(58) Field of Classification Search ........ 370/352–356, 370/395.1, 466, 395.6, 395.61
See application file for complete search history.

(56) References Cited

U.S. PATENT DOCUMENTS

| | | | |
|---|---|---|---|
| 5,410,343 A * | 4/1995 | Coddington et al. .......... 725/99 |
| 5,610,910 A * | 3/1997 | Focsaneanu et al. ........ 370/351 |
| 5,805,591 A * | 9/1998 | Naboulsi et al. ......... 370/395.6 |
| 5,991,292 A * | 11/1999 | Focsaneanu et al. ........ 370/352 |
| 5,991,301 A * | 11/1999 | Christie ..................... 370/395.3 |
| 6,075,784 A | 6/2000 | Frankel et al. |
| 6,141,339 A * | 10/2000 | Kaplan et al. ......... 370/395.61 |
| 6,343,079 B1 * | 1/2002 | Way et al. ................... 370/401 |
| 6,388,990 B1 * | 5/2002 | Wetzel ....................... 370/230 |
| 6,407,997 B1 * | 6/2002 | DeNap et al. .............. 370/352 |
| 6,424,652 B1 * | 7/2002 | Christie ..................... 370/397 |
| 6,434,150 B1 * | 8/2002 | Bog et al. ................ 370/395.1 |
| 6,490,273 B1 * | 12/2002 | DeNap et al. .............. 370/352 |
| 6,512,773 B1 * | 1/2003 | Scott ..................... 370/395.61 |
| 6,526,046 B1 * | 2/2003 | Carew ........................ 370/352 |
| 6,600,733 B2 * | 7/2003 | Deng ......................... 370/352 |
| 6,603,850 B1 * | 8/2003 | Stahl et al. ............ 379/221.02 |
| 2002/0009099 A1 * | 1/2002 | D'Onofrio .................. 370/467 |
| 2002/0097708 A1 * | 7/2002 | Deng ......................... 370/352 |
| 2003/0035471 A1 * | 2/2003 | Pitsoulakis .................. 375/222 |

* cited by examiner

*Primary Examiner*—Chi Pham
*Assistant Examiner*—Blanche Wong

(57) ABSTRACT

The invention is a residential communication hub for a communication system that provides communications services to an end-user. The residential hub is connected to the communications system over a DSL connection. The residential hub converts voice traffic to ATM for transmission over the DSL connection. The communications system includes broadband networks and a service node to facilitate communications services for the end-user.

26 Claims, 11 Drawing Sheets

FIG. 9

| ASSOCIATED POINT CODE | CIC | VP | VC | TRUNK GROUP NUMBER | GROUP MEMBER NUMBER | HARDWARE IDENTIFIER | ECHO CANCELLER | ECHO CONTROL | SATELLITE INDICATOR | CIRCUIT STATUS | CIRCUIT STATE | TIME/DATE |
|---|---|---|---|---|---|---|---|---|---|---|---|---|
| | | | | | | | | | | | | |
| | | | | | | | | | | | | |
| | | | | | | | | | | | | |

FIG. 10

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 11

| EXCEPTION TABLE INDEX | CARRIER SELECTION IDENTIFICATION | CARRIER IDENTIFICATION | NATURE OF ADDRESS | CALLED PARTY | | NEXT FUNCTION | INDEX |
|---|---|---|---|---|---|---|---|
| | | | | DIGITS FROM | DIGITS TO | | |
| | | | | | | | |
| | | | | | | | |
| | | | | | | | |

FIG. 12

| ANI TABLE INDEX | CALLING PARTY CATEGORY | NATURE OF ADDRESS | CALLING PARTY/CHARGE NUMBER | | | NEXT FUNCTION | NEXT INDEX |
|---|---|---|---|---|---|---|---|
| | | | DIGITS FROM | DIGITS TO | DATA | | |
| | | | | | | | |
| | | | | | | | |

Subheader row: ORIGINATING LINE INFORMATION

FIG. 13

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 14

| ROUTING TABLE INDEX | TRANSIT NETWORK SELECTION | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|
| | NETWORK IDENTIFICATION PLAN | DIGITS FROM | DIGITS TO | | | | | | | |
| | | | | | | | | | | |

FIG. 15

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

FIG. 16

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

USER COMMUNICATION HUB FOR USE WITH AN ANALOG PHONE LINE

RELATED APPLICATIONS

This application is a continuation of application Ser. No. 08/826,641, filed on Apr. 4, 1997, and is hereby incorporated by reference into this application.

FEDERALLY SPONSORED RESERCH OR DEVELOPMENT

Not applicable

MICROFICHE APPENDIX

Not applicable

BACKGROUND OF THE INVENTION

1. Field of the Invention

The invention relates to telecommunications systems, and in particular, to telecommunications systems that provide simultaneous voice and broadband services over ATM connections over the local loop.

2. Description of the Prior Art

The telephone wires to the residence are known as the local loop. The local loop has primarily been used to carry POTS traffic and low speed data using modems. POTS is an acronym for "Plain Old Telephone Service" and generally entails voice traffic. Digital Subscriber Line (DSL) technology has been developed to provide greater bandwidth to the local loop. DSL technology superimposes high bandwidth data over the analog POTS traffic on the local loop. This high bandwidth data is transparent to the POTS operation of the local loop. At the central office, the high bandwidth data is removed from the twisted pair and provided to a separate data network. The POTS traffic remains on the twisted pair and is provided to a class 5 switch. As a result, DSL technology allows high bandwidth data and POTS traffic to co-exist on the local loop. POTS traffic is still handled by a class 5 switch in the conventional manner, but the high bandwidth data is removed from the line before the class 5 switch.

Asynchronous Transfer Mode (ATM) and Synchronous Optical Network (SONET) technologies have also been developed to provide broadband transport and switching capability to Local Area Networks (LANs), Wide Area Networks (WANs), and other networks. Prior systems do not contemplate converting the voice traffic to ATM before it is placed on the DSL local loop. This is because standard class 5 switches on the network side of the local loop do not typically handle ATM voice traffic. As a result, ATM technology has not been combined with DSL technology to carry residential POTS traffic. POTS traffic carried by a DSL local loop still requires processing by a complex and expensive class 5 switch.

SUMMARY OF THE INVENTION

The invention is a communications system for providing communications services to an end user at a residence. The communications system comprises: a residential communications hub, a network multiplexer, telephone wiring, a service node, a broadband metropolitan area network ring, and a broadband wide area network ring.

The residential communications hub is located at the residence. It is comprised of a plurality of communications interfaces that communicate with a plurality of end-user communications devices that are located in the residence and that use a plurality of communications formats. The communications interfaces convert between the communications formats and an ATM format. At least one of the communications interfaces is an analog telephony interface that communicates with a telephone that is located in the residence and that uses an analog telephony format. The analog telephony interface converts between the analog telephony format and the ATM format. The residential communications hub is further comprised of a Digital Subscriber Line (DSL) interface that is coupled to the communications interfaces. It communicates with the communications system using an ATM over DSL format.

The network multiplexer converts between the ATM over DSL format and an ATM over broadband format. The telephone wiring connects the residential communications hub and the network multiplexer and carries the ATM over DSL format. The service node receives and processes end-user communications service requests and initiates the establishment of ATM communications paths to support the service requests. The broadband metropolitan area network ring provides ATM over broadband communications paths between the network multiplexer and the service node. The broadband wide area network ring is connected to the service node and provides ATM over broadband communications paths to the service node.

In some embodiments of the invention, the communications system further comprises: a second service node that is connected to the broadband wide area network ring, a second broadband metropolitan area network ring that is connected to the second service node, a second network multiplexer that is connected to the broadband metropolitan area network ring, a second residential hub that is located at a second residence to provide services to a second end-user, and second telephone wiring that connects the second network multiplexer to the second residential hub. The communications system is operational to provide a voice over ATM connection between the residential hubs in response to a service request directed to one of the service nodes.

BRIEF DESCRIPTION OF THE DRAWING FIGURES

FIG. 9 is a logic table used in a version of the invention.

FIG. 10 is a logic table used in a version of the invention.

FIG. 11 is a logic table used in a version of the invention.

FIG. 12 is a logic table used in a version of the invention.

FIG. 13 is a logic table used in a version of the invention.

FIG. 14 is a logic table used in a version of the invention.

FIG. 15 is a logic table used in a version of the invention.

FIG. 16 is a logic table used in a version of the invention.

DETAILED DESCRIPTION OF THE PREFERRED EMBODIMENTS

The invention combines ATM technology with class 5 switch emulation to provide bandwidth, class 5 features, and other services over the local loop. In preferred embodiments, Asymmetrical Digital Subscriber Line (ADSL) technology is used to transport ATM over the local loop. In ADSL, conventional voice traffic (POTS) and high bandwidth data traffic can coexist on the local loop. Currently, ADSL can typically support 6,000,000 bits per second into the residence and 500,000 bits per second out of the residence. For comparison, a conventional telephone conversation requires 64,000 bits per second.

Figure 1:
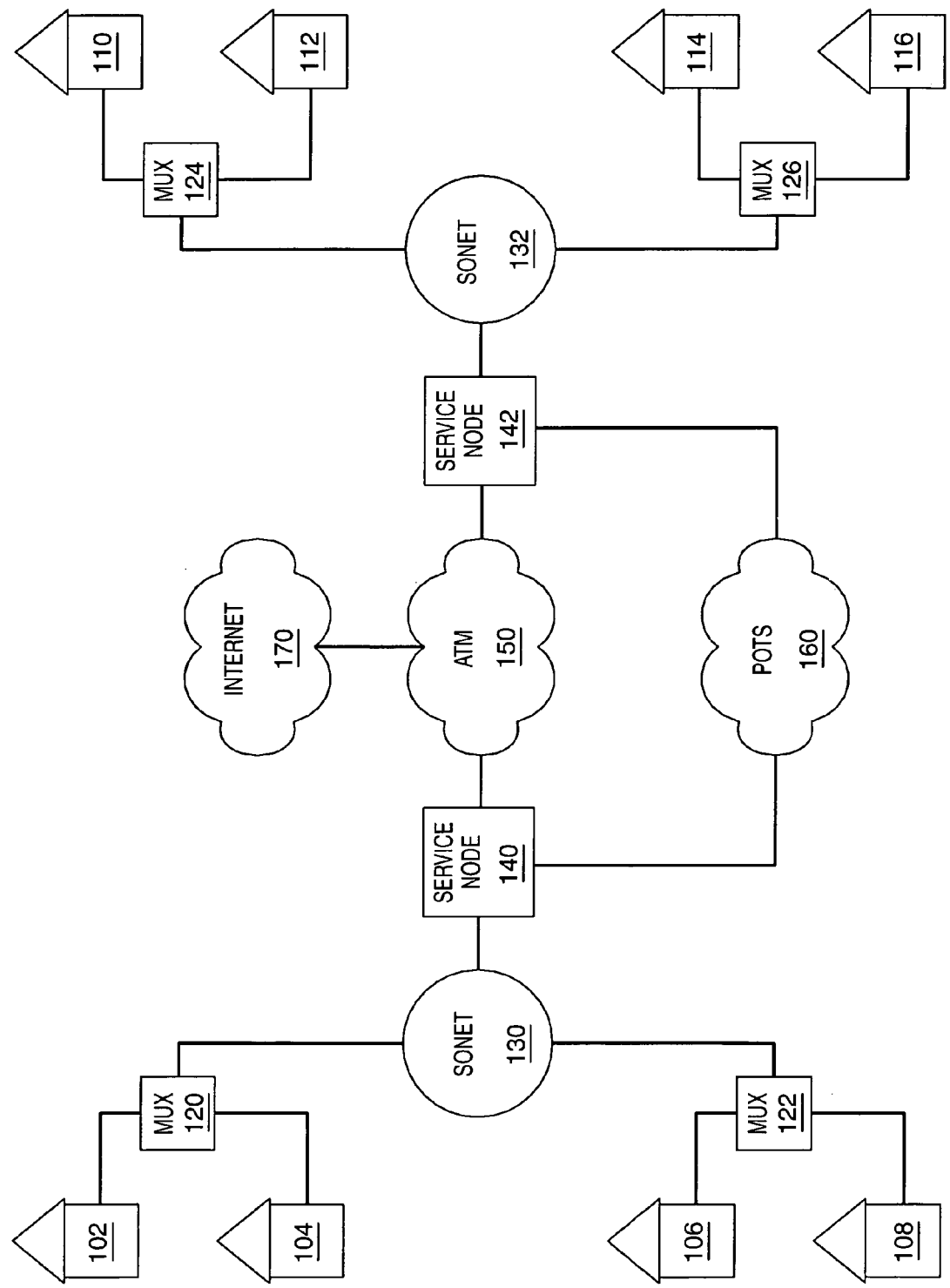
FIG. 1 is a block diagram of a version of the invention.

FIG. 1 depicts a system for some embodiments of the invention, although one skilled in the art will appreciate other variations and implementations covered by the claims. Shown are residences 102, 104, 106, 108, 110, 112, 114, and 116. Residences 102 and 104 are connected to mux 120. Residences 106 and 108 are connected to mux 122. Residences 110 and 112 are connected to mux 124. Residences 114 and 116 are connected to mux 126. The residences are connected to the muxes over ATM connections, and in preferred embodiments, these connections are ADSL/ATM connections. Muxes 120 and 122 are connected to SONET ring 130. Service node 140 is also connected to SONET ring 130. Muxes 124 and 126 are connected to SONET ring 132. Service node 142 is also connected to SONET ring 132. Both service nodes 140 and 142 are connected to ATM network 150 and to POTS network 160. ATM network 150 is connected to internet 170.

The residences have end users who desire communications services. The residences are depicted as homes, but they could also be businesses or other sites where users desire communications services. Typically, the end users operate telephones, computers, fax machines, televisions, and other communications devices. The residences exchange ATM communications with the muxes over the local loops. In preferred embodiments, the residences and the muxes communicate with each other over the local loop using DSL interfaces. In other embodiments, the connections could be ATM carried over wireless links or other high speed connections. The residences also have ATM interfaces that can interwork between end user communications and ATM.

It is important to point out that the invention converts POTS traffic to ATM traffic at the residence, and preferably carries this ATM traffic over an ADSL connection to the mux. The invention also converts non-voice traffic to ATM traffic, and preferrably carries this additional ATM traffic over the current DSL connection to the mux. This represents a distinct advance in the art DSL technology treats POTS in the conventional manner by providing POTS traffic to a class 5 switch.

The muxes have ATM/SONET interfaces to communicate over the SONET rings. In preferred embodiments, the muxes interwork between ADSL connections from the residences and SONET connections to the service nodes. Thus, communications between the residence and the mux are preferably carried over ADSL/ATM connections, and communications between the mux and the service node are preferably carried over SONET/ATM connections. The mux converts between ADSL/ATM and SONET/ATM.

The muxes also have the ability to implement ATM Switched Virtual Circuits (SVCs). Essentially, this means that muxes can interwork ATM cells streams between different virtual connections upon request. This allows various connection options between a residence and a service node. ATM connections could be provisioned as PVC/PVCs from the residence directly to the service node. This tends to waste bandwidth in the SONET rings. ATM connections could be provisioned from the residence to the mux, and the mux and service node could use SVCs to communicate. The entire connection between the residence and the service node could establish SVCs as needed. In addition, combinations of the above could be provided. For example, low bandwidth control channels could be provisioned directly from residence to service node, but higher bandwidth bearer channels could be established on an SVC basis.

The SONET rings provide broadband transport pipes that carry ATM cells. Preferably, the SONET rings are broadband metropolitan area network (B-MAN) rings that serve dense residential and commercial areas. The SONET rings may include ATM switches, including ATM switches that provide the muxes with access to the SONET rings. SONET rings can be self-healing. If a self-healing ring is cut, connectivity is maintained as communications may be transported in the other direction around the ring to bypass the cut. SONET connections are typically provisioned from endpoint to endpoint. The muxes have SONET connections provisioned through the rings to the service nodes. The muxes and service nodes communicate over these ATM/SONET connections.

The service nodes provide an interface between the end users and many communications services and features. The end users communicate with the service nodes to specify end-user communication service requirements. The service nodes then instruct the communications networks to deliver the required services to the end users. It can be seen that the end user communications are converted to ATM at the residence and provided to the service nodes as ATM traffic. This includes POTS traffic. As a result, the residence and service node can support POTS voice over ATM without using a class 5 switch.

ATM network 150 interconnects the various service nodes. Typically, ATM network 150 is a SONET/ATM system comprised of ATM cross-connects and SONET Add Drop Multiplexers (ADMs). ATM network 150 also provides access to internet 170. Internet 170 could be the conventional "Internet" that uses the TCP/IP protocol. The service nodes are also connected to POTS network 160. POTS network 160 is the conventional "Plain Old Telephone Service" that primarily carries telephone voice traffic.

To illustrate the operation of the system depicted in FIG. 1, a few examples will be discussed. One skilled in the art will appreciate that numerous other examples could also be supported by the invention. Consider that an end user at residence 104 may request a telephone conversation with another end user at residence 116. Since both end users are coupled to service nodes, this is an "on-net" call. Residence 104 will send a call request through mux 120 and SONET ring 130 to service node 140. Typically, a provisioned ATM control channel will be used during set-up. Service node 140 will identify the request as on-net and set-up an ATM path between residence 104 and residence 116. This ATM path will utilize mux 120, SONET ring 130, service node 140, ATM network 150, service node 142, SONET ring 132, and mux 126. Typically, ATM PVCs are provisioned between the residences and the muxes, and ATM SVCs are used on the network side of the muxes.

Another end user at residence 104 may desire a telephone conversation with an entity not coupled to a service node. This "off-net" call would be set-up by service node 140 through POTS network 160. Yet another end-user at residence 104 may desire access to internet 170. Service node 140 will accept this request and set-up the connection to internet 170 through mux 120, SONET ring 130, and ATM network 150. Because of the high bandwidth available with ATM over ADSL and SONET, all three of these communication sessions could occur simultaneously.

Figure 2:
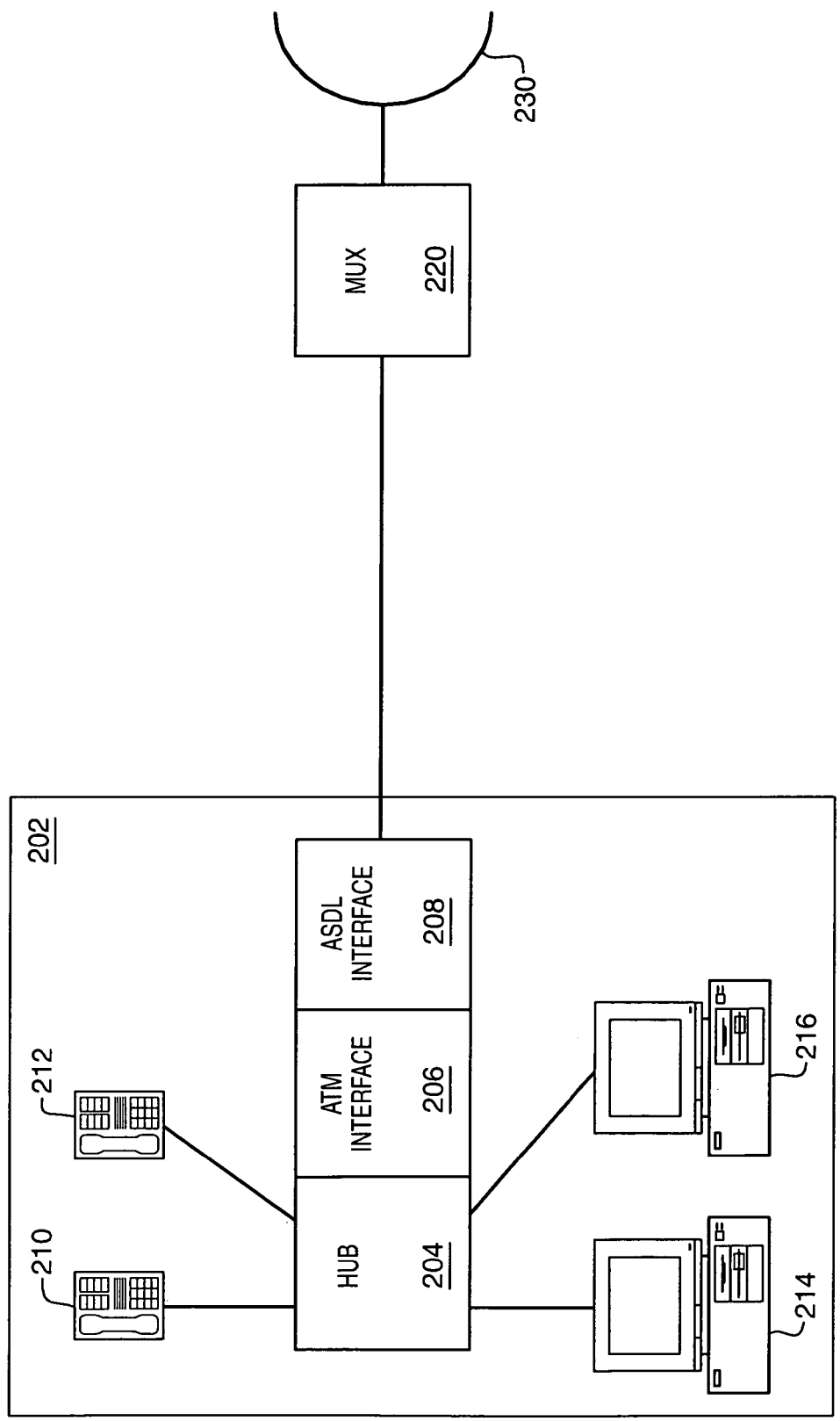
FIG. 2 is a block diagram of a version of the residence.

FIG. 2 depicts an example of a residence in some embodiments of the invention. Where applicable, the reference numbers for components that are similar retain the same final two digits from one figure to the next. Within residence 202 are hub 204, ATM interface 206, ADSL modem 208, telephone 210, telephone 212, computer 214, and computer 216. The telephones and computers are connected to hub 204 over conventional connections. Hub 204 is coupled to ATM interface 206 which is coupled to ADSL modem 208. ADSL modem 206 is connected to mux 220, which is connected to SONET ring 230.

Hub 204 has an analog telephony interface that supports analog telephony communications with the telephones. Hub 204 provides dial tone and power to the telephones. Hub 204 can detect on-hook and off-hook conditions as well as DTMF tones. Hub 204 can also provide ringback and busy tones to the telephones. Each telephone could have its own line or could share lines. Hub 204 communicates with the service node to set-up communications sessions for the telephones.

Hub 204 also provides a LAN/router function to the computers. For example, hub 204 could be equipped with an ethernet interface for connection to the computers. When a communications request is made by one of the computers, hub 204 routes the request to the service node. ATM interface 206 can integrate voice, video, and data over high-bandwidth ATM connections for the telephones and computers. ATM interface 206 provides ATM cells to ADSL modem 206 for transport to mux 220. Mux 220 is connected to SONET ring 230. Conventional requirements for hub 204 can be found in Telecommunications Industry Association (TIA) document SP-3771.

Figure 3:
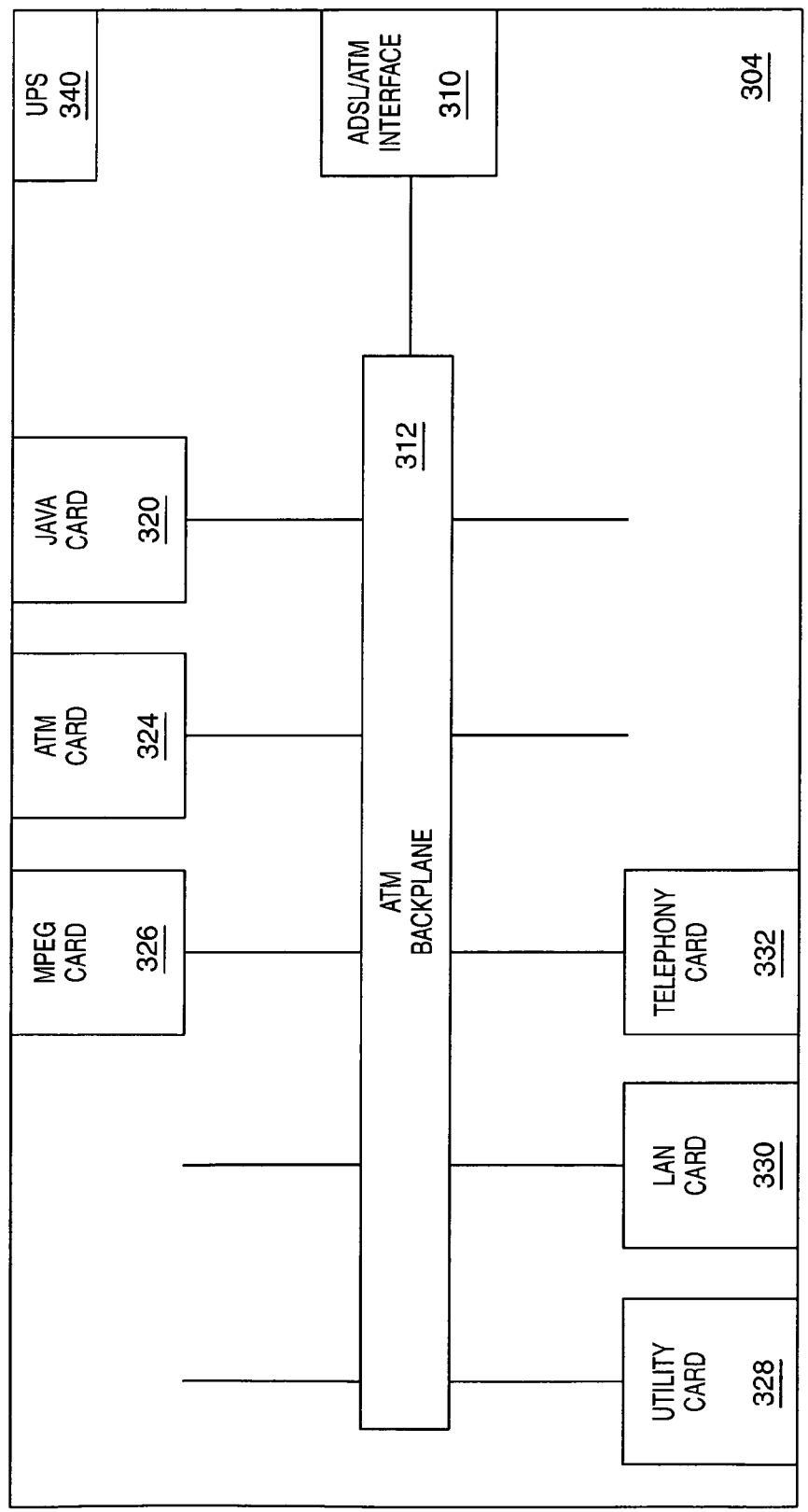
FIG. 3 is a block diagram of a version of the residential hub.

FIG. 3 depicts an example of the residential components of some embodiments of the invention. Shown is hub 304 and it includes ADSL/ATM interface 310 and ATM backplane 314. Together, these components allow for ATM communications within the hub and with external elements through ADSL/ATM interface 310. ADSL/ATM interface 310 converts end user control and communications into the ADSL/ATM format for transport to the service node. ATM/ADSL interface 310 also receives communications and control from the service node and provides these to the appropriate components of hub 304. ADSL/ATM 310 interface also provides smoothing and shaping for the ATM signals.

Also shown are several cards connected to ATM backplane 314. These are: Java card 320, ATM card 324, MPEG card 326, utility card 328, LAN card 330, and telephony card 332. The cards provide communications services to the end users as discussed below. The cards can communicate with each other or through ATM backplane 314. They can also communicate with the service node directly through interface 310. An uninteruptable power supply (UPS) may be included if desired in order to provide power during an outage to the home.

Java card 320 includes a processor and memory and is operational to receive Java applets from the service node. Java applets can support a wide variety of tasks. In particular, Java applets can be used to provide the intelligence to support class 5 features, such as call waiting and call forwarding. Java card 320 also exerts control over the cards and ADSL/ATM interface 310. This could include ATM virtual connection assignments for communications to the mux or service node. Java card 320 may also communicate with the service node to request numerous other communications services.

ATM card 324 provides an ATM interface to devices within the residence. If ATM card 324 exchanges ATM signaling with resident devices over VPI=0 and VPI=5, then ATM card 325 may use virtual path associated signaling to exchange control information with the service node. MPEG card 326 provides an MPEG interface to devices within the residence. MPEG is a video formatting standard. Typically, MPEG card 326 will receive MPEG formatted video in ATM cells through ADSL/ATM interface 310 and provide video signals to devices in the residence. Utility card 328 is a card that is couple to utility metering devices in the home. The utility card is programmed to collect the metering information and forward it to the utility companies through ADSL/ATM interface 310. LAN card 330 supports a LAN that is internal to the residence. For, example, LAN card 330 could support ethernet connections to multiple computers. The computers could access the Internet through LAN card 330 and ADSL/ATM interface 310.

Telephony card 332 supports analog telephony communications with the telephones. Telephony card 332 provides dial tone and power to the telephones. Telephony card 332 can detect on-hook and off-hook conditions as well as DTMF tones. Telephony card 332 can also provide ringback and busy tones to the telephones. In some embodiments, telephony card 332 provides echo cancellation or other digital signal processing functions. Telephony card 332 can forward control information (i.e. off-hook+dialed number) to the service node either directly through ADSL/ATM interface 310 or through Java card 320 and ADSL/ATM interface 310.

Figure 4:
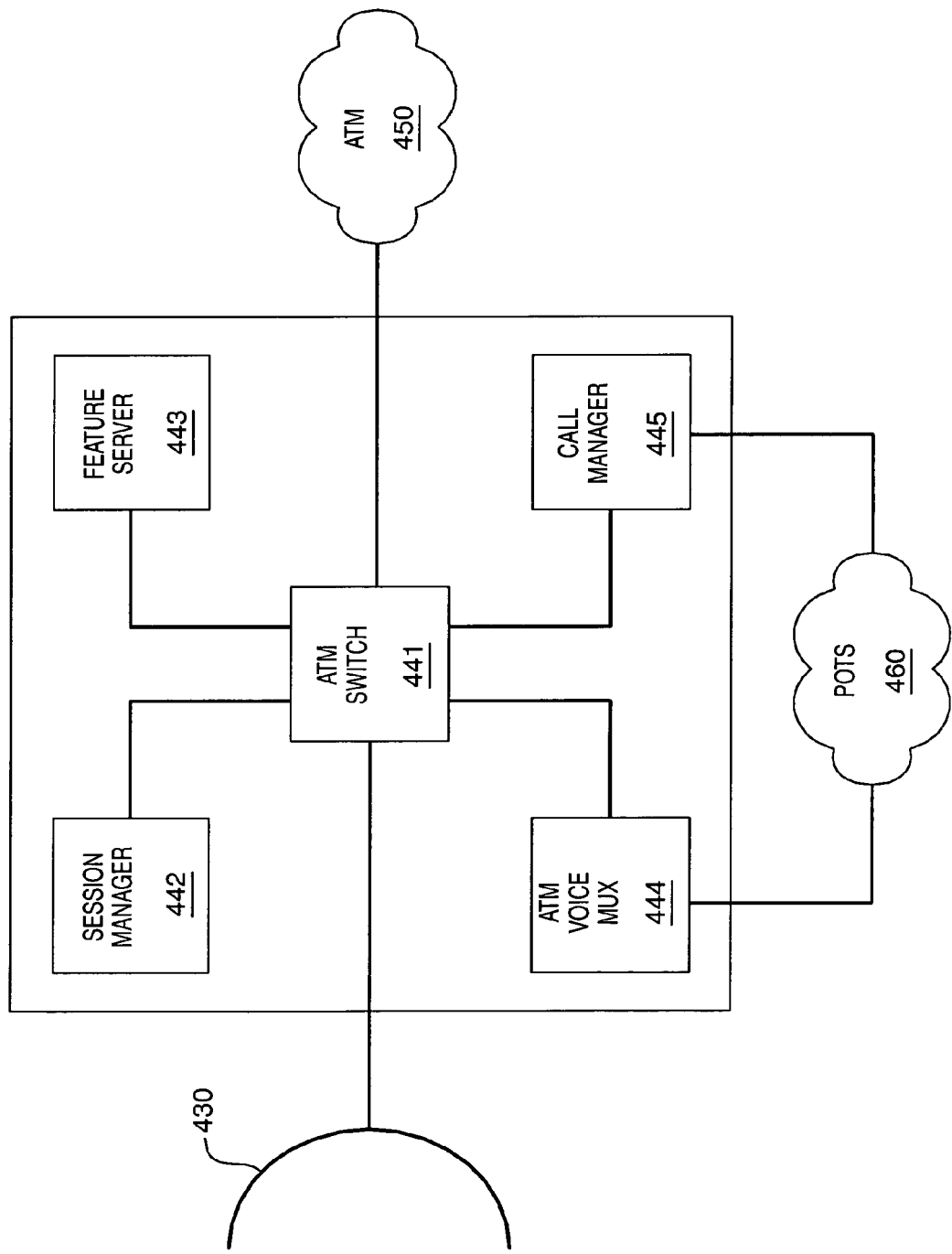
FIG. 4 is a block diagram of a version of the service node.

FIG. 4 depicts an example of a service node for some embodiments of the invention. Shown is service node 440. It comprises ATM switch 441, session manager 442, feature server 443, ATM voice mux (AVM) 443 and public switched telephone network (PSTN) gateway 445. ATM switch 441 is connected to SONET ring 430 and ATM network 450. AVM 444 and Call Manager 445 are connected to POTS network 460. ATM switch 441 is able to establish switched virtual circuits (SVCs) in response to control instructions from session manager 442. Feature server 443 provides various features to the end users. Feature server 443 may provide class 5 features to end users. Feature server 443 may download software or Java applets to the residential hub. Feature server could provide other features, such as intranets, voice mail, or personalized internet web pages and browsers.

Session manager 442 is a communications control processor that initiates services for the end users. Session manager 442 is compliant with the Telecommunications Information Network Architecture Consortium (TINA-C) requirements. It houses the user agent and the residential hub houses the provider agent. Together, the user agent and the provider agent communicate to establish requirements for a communications service. One requirement is quality of service and it typically entails bandwidth, priority, as well as other factors. The session manager issues control messages to the required elements to deliver the communications service.

The combination of the provider agent and session manager provides numerous incoming call management capabilities. Based on these capabilities, the users can establish their own preferences and policies. If a single phone number is assigned to all the phones, then one policy for handling incoming calls would be to ring all the idle phones. When one of the phones is answered, the call is routed to that phone and the ringing is stopped at the other phones. Another policy would be that a particular idle phone is selected for ringing. The selection could also be based on any number of inputs such as the caller identity, time of day, day of week, etc. In general, a very flexible association between phone numbers and assigned telephone lines can be created. There can be one phone number per line, or there can be more phone numbers than lines with distinctive ringing based on the called number.

If the user has a personal computer with an HTML browser, the user can access a network service that can allow the user to create a personalized set of call management rules that control communications with the user. This would be achieved via a graphical application where the user creates a decision tree by putting components together on a palette. This information would be distributed between the session manager and the provider agent. For example, the session manager would know which calls to route to voice mail based on the caller's identity. For such a call, the provider agent will not need to get a call message from session manager. On the other hand, the logic discussed above that handles which phone(s) to alert will be encapsulated in the provider agent.

AVM 444 provides a bearer channel interface between POTS network 460 and ATM switch 441. Typically, the requires interworking DS0 connections with ATM virtual connections. Call Manager 445 provides a call processor and SS7 signaling interface between POTS network 460 and session manager 442 (through ATM switch 441). Typically, this requires processing session manager requests and generating SS7 messages for POTS network 460. In addition, SS7 messages from POTS network 460 are received and processed by Call manager 460, and control information is passed to session manager 442.

Figure 5:
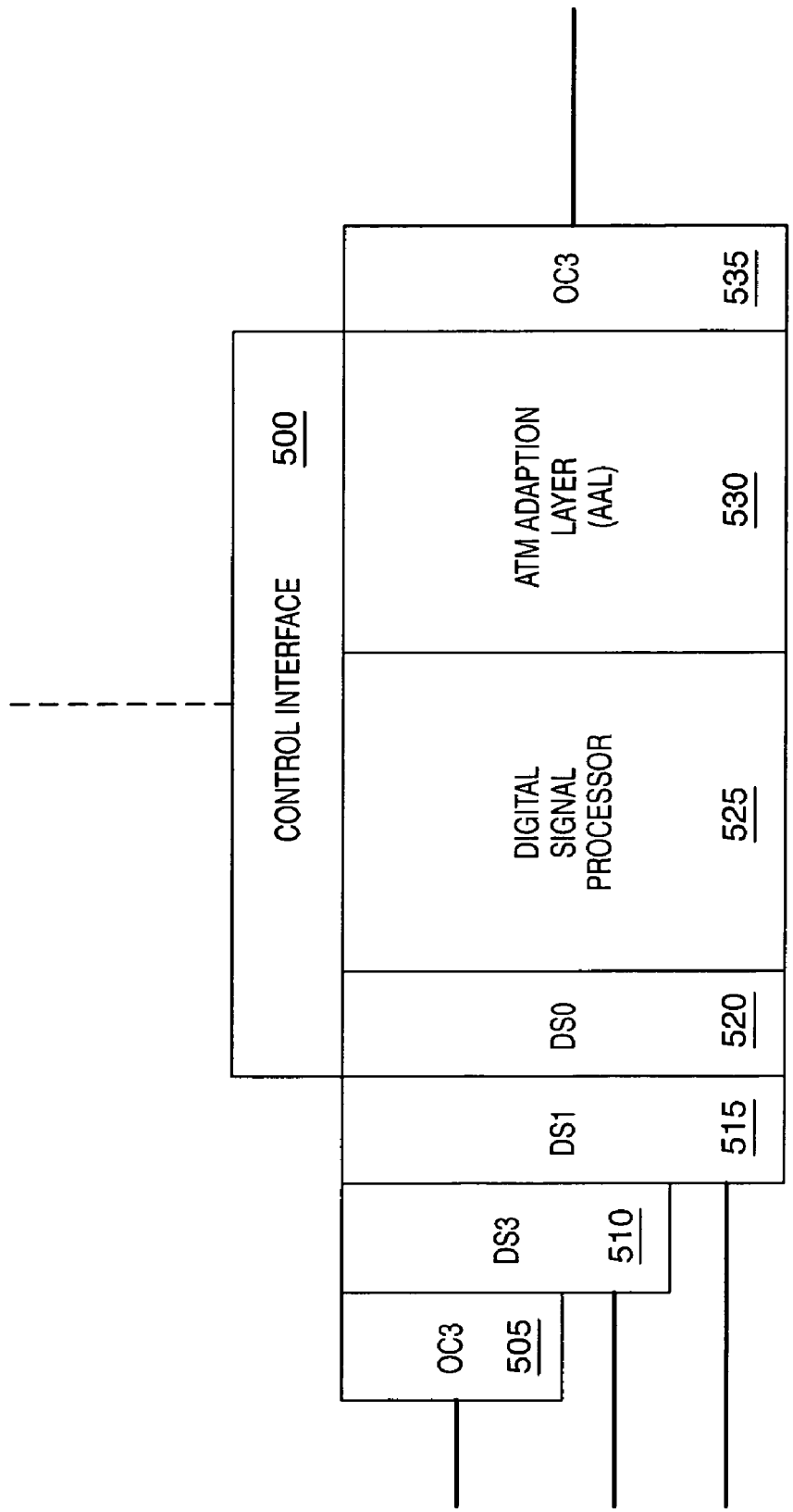
FIG. 5 is a message sequence chart of a version of the invention.

FIG. 5 shows one embodiment of the mux that is suitable for the present invention, but other muxes that support the requirements of the invention are also applicable. Shown are control interface 500, OC-3 interface 505, DS3 interface 510, DS1 interface 515, DS0 interface 520, digital signal processor 525, ATM adaption Layer (AAL) 530, and OC-3 interface 535.

Control interface 500 accepts messages from the call manager. In particular, control interface 500 provides DS0/virtual connection assignments to AAL 530 for implementation. Control interface 500 may accept control messages from the call manager with messages for DS0 520. These messages could be to connect DS0s to: 1) other DS0s, 2) digital signal processor 525, or 3) AAL 530 (bypassing digital signal processor 525). Control interface 500 may accept control messages from the call manager with messages for digital signal processing 525. An example of such an message would be to disable an echo canceller on a particular connection.

OC-3 interface 505 accepts the OC-3 format and makes the conversion to DS3. DS3 interface 510 accepts the DS3 format and makes the conversion to DS1. DS3 interface 510 can accept DS3s from OC-3 interface 505 or from an external connection. DS1 interface 515 accepts the DS1 format and makes the conversion to DS0. DS1 interface 515 can accept DS1s from DS3 interface 510 or from an external connection. DS0 interface 520 accepts the DS0 format and provides an interface to digital signal processor 525 or AAL 530. In some embodiments, DS0 interface 520 could be capable of directly interconnecting particular DS0s. This could be the case for call entering and egressing from the same mux. This would also be useful to facilitate continuity testing by a switch. OC-3 interface 535 is operational to accept ATM cells from AAL 530 and transmit them, typically over the connection to the ATM switch in the service node.

Digital signal processor 525 is operational to apply various digital processes to particular DS0s in response to control messages received through control interface 500. Examples of digital processing include: tone detection, tone transmission, loopbacks, voice detection, voice messaging, echo cancellation, compression, and encryption. In some embodiments, digital signal processing 525 could handle continuity testing. For example, the call manager may instruct the mux to provide a loopback for a continuity test and or disable cancellation for a call. Digital signal processor 525 is connected to AAL 530. As discussed, DS0s from DS0 interface 520 may bypass digital signal processing 525 and be directly coupled to AAL 530.

AAL 530 comprises both a convergence sublayer and a segmentation and reassembly (SAR) layer. AAL 530 is operational to accept the user information in DS0 format from DS0 interface 520 or digital signal processor 525 and convert the information into ATM cells. AALs are known in the art and information about AALs is provided by International Telecommunications Union (ITU) document I.363. An AAL for voice is also described in patent application Ser. No. 08/395,745, filed on Feb. 28, 1995, entitled "Cell Processing for Voice Transmission", and hereby incorporated by reference into this application. AAL 530 obtains the virtual path identifier (VPI) and virtual channel identifier (VCI) for each call from control interface 500. AAL 530 also obtains the identity of the DS0 for each call (or the DS0s for an N×64 call). AAL 530 then converts user information between the identified DS0 and the identified ATM virtual connection. Acknowledgments that the assignments have been implemented may be sent back to the call manager if desired. Calls with a bit rate that are a multiple of 64 kbit/second are known as N×64 calls. If desired, AAL 530 can be capable of accepting control messages through control interface 500 for N×64 calls.

As discussed above, the mux also handles calls in the opposite direction—from OC-3 interface 535 to DS0 interface 520. Control interface 500 will provide AAL 530 with the assignment of the selected VPI/VCI to the selected outbound DS0. The mux will convert the ATM cells with the selected VPI/VCI in the cell headers into the DS0 format and provide it to the selected outbound DS0 connection.

A technique for processing VPI/VCIs is disclosed in patent application Ser. No. 08/653,852, filed on May 28, 1996, entitled "Telecommunications System with a Connection Processing System," and hereby incorporated by reference into this application.

The call manager is a signaling processor that is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in a U.S. patent application Ser. No. 08/754,349, which is entitled "Telecommunication System," which is assigned to the same assignee as this patent application, and which is incorporated herein by reference.

In addition to selecting connections with the POTS network, the CCM performs many other functions in the context of call processing. It not only can control routing and select the actual connections, but it can also validate callers, control echo cancellers, generate billing information, invoke intelligent network functions, access remote databases, manage traffic, and balance network loads. One skilled in the art will appreciate how the CCM described below can be adapted to operate in the above embodiments.

Figure 6:
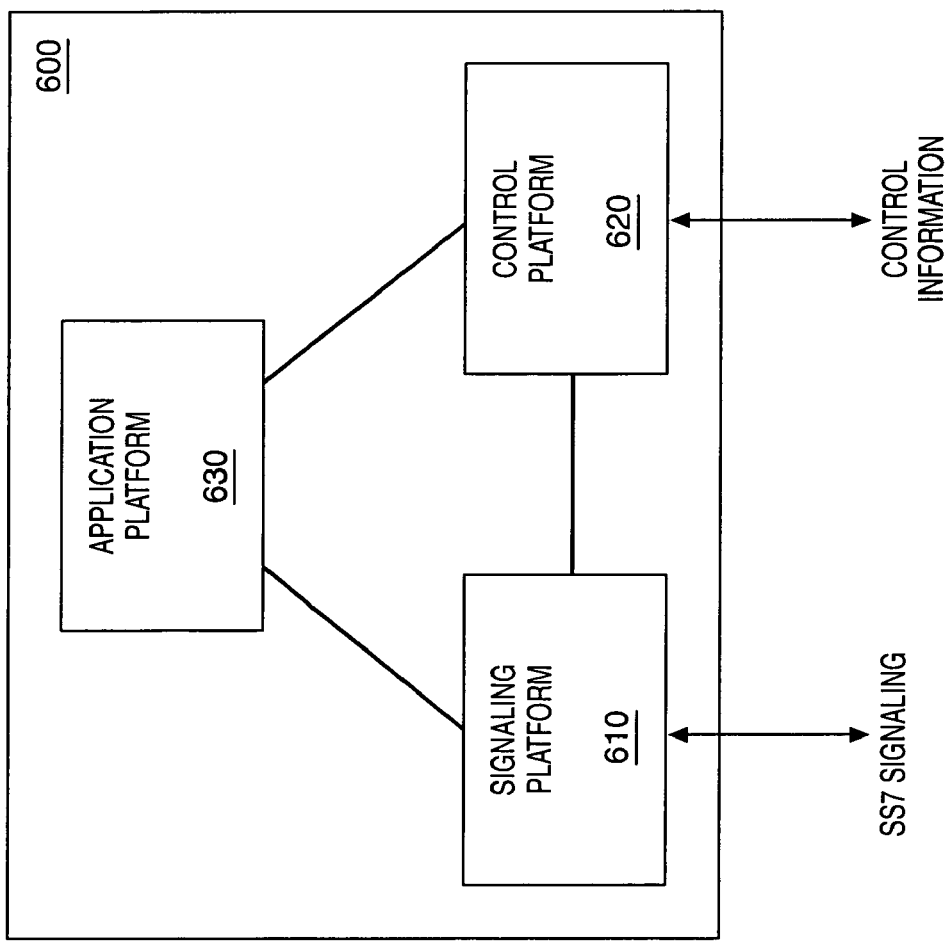
FIG. 6 is a block diagram of a version of the invention.

FIG. 6 depicts a version of the CCM. Other versions are also contemplated. In the embodiment of FIG. 6, CCM 600 controls an ATM interworking multiplexer (mux) that performs interworking of DS0s and VPI/VCIs. However, the CCM may control other communications devices and connections in other embodiments.

CCM 600 comprises signaling platform 610, control platform 620, and application platform 630. Each of the platforms 610, 620, and 630 is coupled to the other platforms.

Signaling platform 610 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). Control platform 620 is externally coupled to a mux control, an echo control, a resource control, billing, and operations.

Signaling platform 610 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

Control platform 620 is comprised of various external interfaces including session manager interface, a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources via the session manager. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of CCM 600. One skilled in the art will appreciate how to produce the software for the interfaces in control platform 620.

Application platform 630 is functional to process signaling information from signaling platform 610 in order to select connections. The identity of the selected connections are provided to control platform 620 for the mux interface. Application platform 630 is responsible for validation, translation, routing, call control, exceptions, screening, and error handling. In addition to providing the control requirements for the mux, application platform 630 also provides requirements for echo control and resource control to the appropriate interface of control platform 620. In addition, application platform 630 generates signaling information for transmission by signaling platform 610. The signaling information might be ISUP, INAP, or TCAP messages to external network elements. Pertinent information for each call is stored in a call control block (CCB) for the call. The CCB can be used for tracking and billing the call.

Application platform 630 operates in general accord with the Basic Call Model (BCM) defined by the ITU. An instance of the BCM is created to handle each call. The BCM includes an originating process and a terminating process. Application platform 630 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for application platform 630 can be produced in specification and description language (SDL) defined in ITU-T Z. 100. The SDL can be converted into C code. Additional C and C++ code can be added as required to establish the environment.

From FIG. 6, it can be seen that application platform 630 processes signaling information to control numerous systems and facilitate call connections and services. The SS7 signaling is exchanged with external components through signaling platform 610, and control information is exchanged with external systems through control platform 620. Advantageously, CCM 600 is not integrated into a switch CPU that is coupled to a switching matrix. Unlike an SCP, CCM 600 is capable of processing ISUP messages independently of TCAP queries.

SS7 messages are well known. Designations for various SS7 messages commonly are used. Those skilled in the art are familiar with the following message designations:
ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR Continuity Check Request
EXM—Exit Message
INF—Information
INR—Information Request
IAM—Initial Address
LPA—Loop Back Acknowledgment
PAM—Pass Along
REL—Release RLC—Release Complete
RSC—Reset Circuit
RES—Resume
SUS—Suspend
UBL—Unblocking
UBA—Unblocking Acknowledgment
UCIC—Unequipped Circuit Identification Code.

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 7:
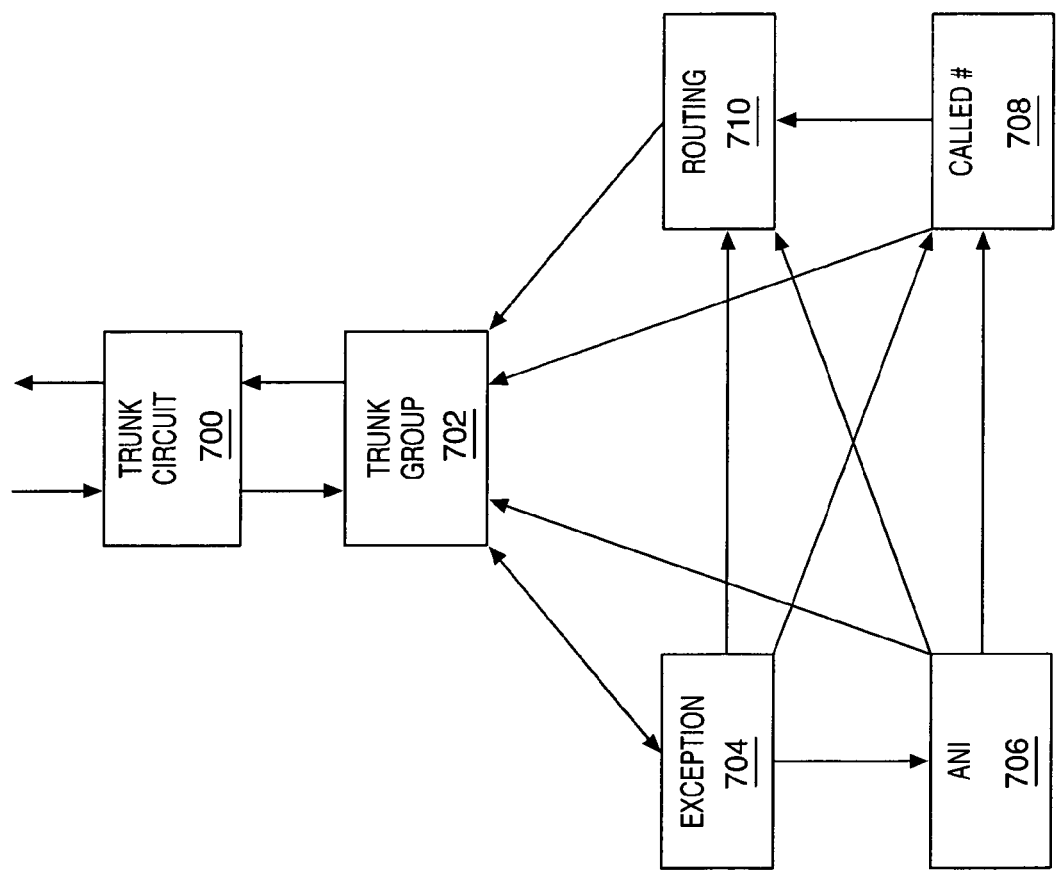
FIG. 7 is a logic diagram of a version of the invention.

FIG. 7 depicts a data structure used by application platform 630 of FIG. 6 to execute the BCM. This is accomplished through a series of tables that point to one another in various ways. The pointers are typically comprised of next function and next index designations. The next function points to the next table, and the next index points to an entry or a range of entries in that table. The data structure has trunk circuit table 700, trunk group table 702, exception table 704, ANI table 706, called number table 708, and routing table 710.

Trunk circuit table 700 contains information related to the connections. Typically, the connections are DS0 or ATM connections. Initially, trunk circuit table 700 is used to retrieve information about the originating connection. Later, the table is used to retrieve information about the terminating connection. When the originating connection is being processed, the trunk group number in trunk circuit table 700 points to the applicable trunk group for the originating connection in trunk group table 702.

Trunk group table 702 contains information related to the originating and terminating trunk groups. When the originating connection is being processed, trunk group table 702 provides information relevant to the trunk group for the originating connection and typically points to exception table 704.

Exception table 704 is used to identify various exception conditions related to the call that may influence the routing or other handling of the call. Typically, exception table 704 points to ANI table 706. Although, exception table 704 may point directly to trunk group table 702, called number table 708, or routing table 710.

ANI table 706 is used to identify any special characteristics related to the caller's number. The caller's number is commonly known as automatic number identification (ANI). ANI table 706 typically points to called number table 708. Although, ANI table 706 may point directly to trunk group table 702 or routing table 710.

Called number table 708 is used to identify routing requirements based on the called number. This will be the case for standard telephone calls. Called number table 708 typically points to routing table 710. Although, it may point to trunk group table 702.

Routing table 710 has information relating to the routing of the call for the various connections. Routing table 710 is entered from a pointer in either exception table 704, ANI table 706, or called number table 708. Routing table 710 typically points to a trunk group in trunk group table 702.

When exception table 704, ANI table 706, called number table 708, or routing table 710 point to trunk group table 702, they effectively select the terminating trunk group. When the terminating connection is being processed, the trunk group number in trunk group table 702 points to the trunk group that contains the applicable terminating connection in trunk circuit table 702. The terminating trunk circuit is used to extend the call. The trunk circuit is typically a VPI/VCI or a DS0. Thus it can be seen that by migrating through the tables, a terminating connection can be selected for a call.

Figure 8:
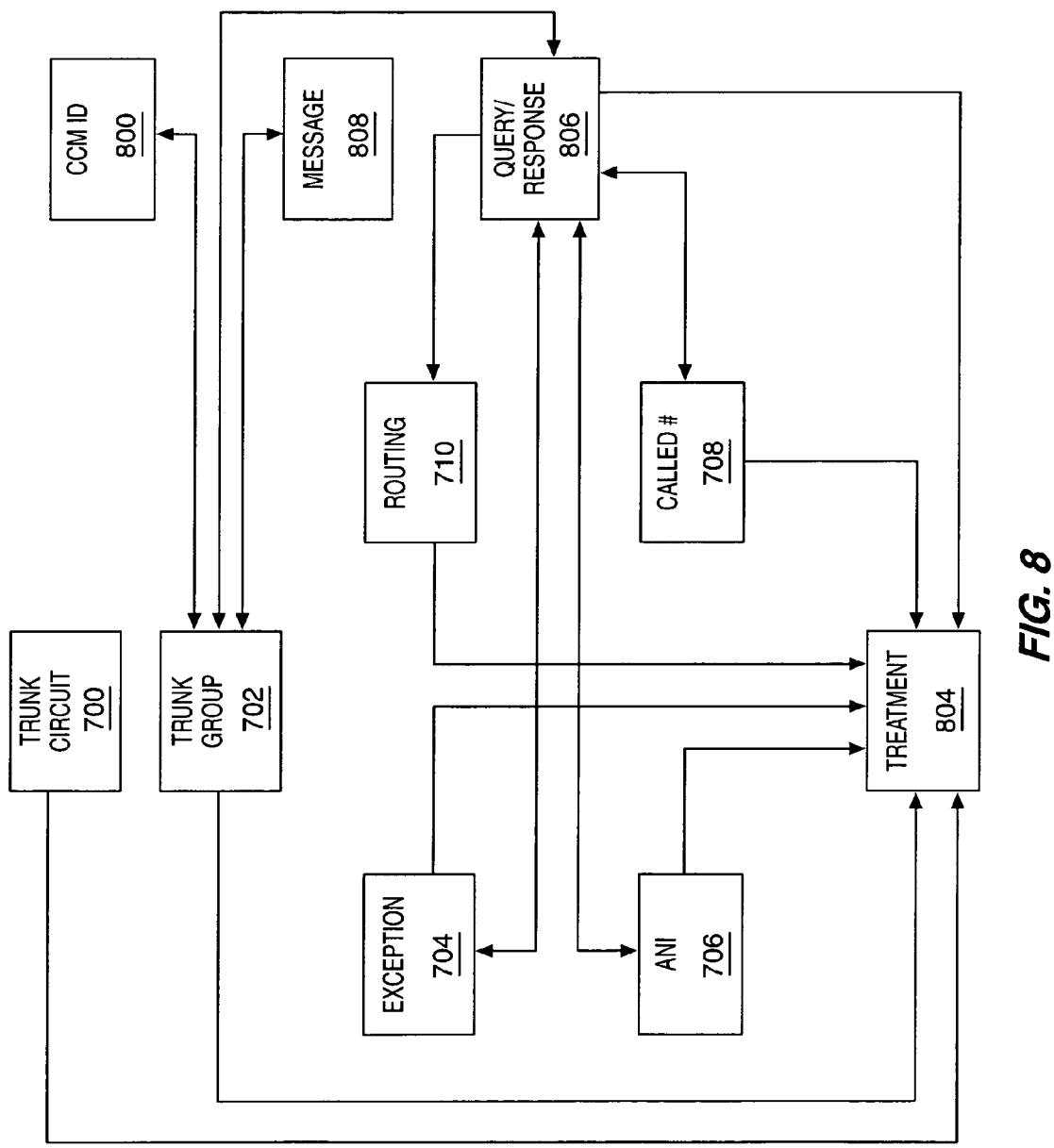
FIG. 8 is a logic diagram of a version of the invention.

FIG. 8 is an overlay of FIG. 7. The tables from FIG. 7 are present, but for clarity, their pointers have been omitted. FIG. 8 illustrates additional tables that can be accessed from the tables of FIG. 7. These include CCM ID table 800, treatment table 804, query/response table 806, and message table 808.

CCM ID table 800 contains various CCM SS7 point codes. It can be accessed from trunk group table 702, and it points back to trunk group table 702. Treatment table 804 identifies various special actions to be taken in the course of call processing. This will typically result in the transmission of a release message (REL) and a cause value. Treatment table 804 can be accessed from trunk circuit table 700, trunk group table 702, exception table 704, ANI table 706, called number table 708, routing table 710, and query/response table 806.

Query/response table 806 has information used to invoke the SCF. It can be accessed by trunk group table 702, exception table 704, ANI table 706, called number table 708, and routing table 710. It points to trunk group table 702, exception table 704, ANI table 706, called number table 708, routing table 710, and treatment table 804. Message table 808 is used to provide instructions for messages from the termination side of the call. It can be accessed by trunk group table 702 and points to trunk group table 702.

FIGS. 9–16 depict examples of the various tables described above. FIG. 9 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceller (EC) identification (ID) entry identifies the echo canceller for the originating circuit.

The remaining fields are dynamic in that they are filled during call processing. The echo control entry is filled based on three fields in signaling messages: the echo suppressor indicator in the LAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 10 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 11 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+calls, 1+calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 12 depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 13 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 11. The next function and next index point to the next table which is typically the routing table.

FIG. 14 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 9–14 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 15 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 16 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Operation of a detailed embodiment of the invention will now be discussed with reference to FIGS. 1–4. Those skilled in the art will appreciate that numerous other examples could also be supported by the invention. An end user at residence 102 may request a telephone conversation with another end user at residence 116 by picking up telephone 210 and dialing the number of a telephone at residence 116. As both end users are coupled to service nodes, this is an on-net call. Telephony card 332 in hub 304 of residence 102 will detect the off-hook, supply dial tone, and detect dialed digits. This information will be forwarded in a message carried over ATM cell(s) to session manager 442 at the service node 140 (440 on FIG. 4). Session manager 442 will determine that the call is on-net and send a control message to ATM switch 441 at service node 140 to establish an SVC from mux 120 to mux 126 through SONET rings 130 and 132 and ATM network 150. (In the alternative, the session manager could contact each of these resources to set-up the connection.) The connections between the muxes and the residences have preferably been provisioned, but they may also be established on an SVC basis. Session manager 442 will instruct the telephony card at residence 116 to facilitate call set up, and the telephony card will ring the appropriate telephone. When the end user at residence 116 picks up the ringing telephone, a voice conversation may ensue over the end to end ATM path.

If an off-net call is attempted by an end-user at residence 102, a similar process occurs except that session manager 442 at service node 140 recognizes the off-net destination and sends a control instruction to call manager 445 to process the call. In some embodiments, this could be a SS7 IAM, and in other embodiments it could be a control message provided over a non-SS7 interface. Call manager 445 processes the dialed number and issues an SS7 Initial Address Message (IAM) to the appropriate network element in POTS network 160. Session manager 442 instructs ATM switch 441 to set-up an SVC from mux 120 to AVM 444 at service node 140. Call manager 445 instructs AVM 444 of the particular DS0 to interwork with this SVC. As a result, the call is extended from service node 140 to POTS network 160. POTS network 160 completes the call in the conventional manner.

If an internet session is attempted by an end user at residence 102 using computer 214, LAN card 330 in hub 204 at residence 102 will receive the connection request and forward it to Java card 320. Java card 320 will send a control message to session manager 442 at service node 140. Session manager 442 will instruct ATM switch 441 to establish an SVC from mux 120 to internet 170 through ATM network 150. The connection between mux 120 and LAN card 330 may be established on an SVC basis, or it may already be provisioned. Because of the high bandwidth available, all three of the above communication sessions could occur simultaneously.

An important feature of the residential hub is the support of legacy applications by providing a proxy. An example is how the telephony card supports POTS calls. The telephones operate in their normal manner, and the telephony card provides an "interpreter" between the telephone and the session manager. This "interpreter" function is a proxy. A proxy could also be provided for legacy Internet communications. The LAN card or Java card could be programmed to act as the proxy. When a computer at the residence attempted an Internet communication, the proxy would intercept the IP packet. It could either translate the IP address into a destination and provides it to the session manager, or simply forward the IP address the session manager. Either way, the session manager would set up an ATM SVC to the destination. The legacy application on the computer could communicate using IP addressing, but would be supplied with ATM connections using the proxy.

The hub and session manager could provide proxy communications as follows. The session manager will house a generic service manager at an abstract level. The session manager will also house various service specific service managers derived from the generic service manager. Typically, the session manager houses the user agent and the residential hub houses the provider agent. The provider agent communicates with the service specific service manager to negotiate a service request. In a proxy situation, the proxy at the hub becomes the provider agent in the TINA model. This proxy/provider agent at the hub will communicate with the service specific service manager at the session manager to set-up the communications session.

In addition to establishing connections, the residential hub and service node provide a powerful platform to deliver services to the end user. The feature server at the service node could download Java applets to the Java CPU at the residential hub. This opens up a vast array of Java based services and could facilitate the use of network computers at the residence. These Java applets could be used to provide class 5 features to the telephones at the residence. For example, if the user requests call forwarding, a call forwarding Java applet could be downloaded to the Java card. The Java card could interface with the user (i.e. over a telephone or computer) to collect the forwarding number. The Java card could then provide the forwarding number to the session manager. The session manager would direct all subsequent calls to the forwarding number. The feature server could also house a call-waiting applet. If a user invokes call-waiting, the feature server would download a call-waiting applet to the Java card. The Java card would control the telephony card to notify the user when an incoming call arrives during off-hook. The end-user would indicate acceptance of the other call with a hook flash detected by the telephony card. The end user class 5 features that today are provided centrally by a class 5 switch can be distributed over the residential communications hub, the session manager, and the feature server in this system. Allocation of intelligence in this manner offers the flexibility to easily customize and compose new services in a modular way. The following examples explain how some common class 5 features can be distributed. The provider agent in the residential hub can be responsible for performing the caller ID and call waiting features. Depending on the capabilities of the phones connected to the residential communications hub, the provider agent can notify the user either visually or with audio messages. This is handled independently without the involvement of the session manaager. On the other hand, call forwarding is responsible for capturing the forwarding number from the user. This information is passed to the session manager which updates call routing tables accordingly. In addition to serving as a repository for calss 5 feature related applets that maybe downloaded to a residential communications hub, the feature server will have shared resources such as audio bridges to provide conference calling features to the end users. Those skilled in the art will appreciate how numerous features could be supplied in this manner.

The feature server could also store personalized customer profiles and features. For example, personal intranets and browsers for end users could be stored in the feature server. By clicking an icon on a computer screen, an end user could access a personalized browser downloaded from the feature server. The personalized browser could be used to establish numerous forms of communications. One click on the browser could result in a telephone call set-up by the session manager—either on-net or off-net. Another click on the browser could result in the retrieval of information from the World Wide Web using a Uniform Resource Locator (URL).

The feature server could also house personalized web pages for end users. The end users could monitor and modify their web page from their home computer. Others would be able to access the web page in the conventional way by accessing the feature server from the Internet. This would allow the end user to utilize e-mail through their web page. The feature server could be used to house media resources for the end users. A few examples would be yellow pages of Internet directories. The feature server could also provide a voice mail platform for the end user. The feature server could download various forms of software to the computers at the residence—for example, banking software.

As demonstrated above, the invention provides a powerful platform for delivering services to the end user. By providing POTS service using the telephony card, Java card, feature server, and session manager, POTS traffic can be integrated with other residential traffic over an ATM system. This allows the network to combine all traffic onto an ATM core. This also allows the network to offer a complete communications package to the end-user. In addition to POTS, the service node can provide other capabilities, such as home security, telecommuting, Internet connections, electronic gaming, electronic commerce, and video applications.

We claim:

1. A user communication hub for providing communications services to an end user at a user location, wherein the user communication hub comprises:
   a plurality of communication interfaces that are operational to communicate with a plurality of end-user communication devices that are located at the user location and that use a plurality of communications formats, wherein the communication interfaces are operational to convert between the communications formats and an ATM format, wherein at least one of the communication interfaces comprises an analog telephony interface that communicates with a telephone that is located at the user location and that uses an analog telephony format, wherein the analog telephony interface is operational to convert between the analog telephony format and the ATM format;
   a Asynchronous Digital Subscriber Line (ADSL) interface that is coupled to the communications interfaces and a communication system and said ADSL interface is operational to communicate with the communication system using an ADSL with ATM over DSL format.

2. The user communication hub of claim 1 wherein the analog telephony interface is operational to provide dial tone and power to the telephone.

3. The user communication hub of claim 1 wherein the analog telephony interface is operational to detect on-hook and off-hook conditions.

4. The user communication hub of claim 1 wherein the analog telephony interface is operational to detect dual tone multi-frequency (DTMF) tones.

5. The user communication hub of claim 1 wherein the analog telephony interface is operational to provide echo cancellation.

6. The user communication hub of claim 1 wherein the analog telephony interface is operational to forward control information to a service node in the communication system.

7. The user communication hub of claim 1 wherein one of the communication interfaces comprises a computer interface operational to convert between a computer format and the ATM format.

8. The user communication hub of claim 7 wherein the computer interface comprises an ethernet interface.

9. The user communication hub of claim 7 wherein the computer interface is operational to route a communication request from a computer to a service node in the communication system.

10. The user communication hub of claim 1 wherein one of the communication interfaces comprises a Java interface operational to receive Java applets from the communication system.

11. The user communication hub of claim 1 wherein one of the communication interfaces comprises an ATM interface operational to exchange ATM signaling between the end-user communication devices and the communication system.

12. The user communication hub of claim 1 wherein one of the communication interfaces comprises a MPEG interface operational to provide video signals to the end-user communication devices from the ATM format.

13. The user communication hub of claim 1 wherein one of the communication interfaces comprises a utility interface operational to collect and forward metering information to the communication system.

14. A method for providing communications services to an end user at a user location using a user communication hub that comprises a plurality of communication devices and a Asynchronous Digital Subscriber Line (ADSL) interface that is coupled to the communications interfaces and a communication system line wherein at least one of the communication interfaces comprises an analog telephony interface, the method comprising:
   in the plurality of communication interfaces, communicating with a plurality of end-user communication devices that are located at the user location and that use a plurality of communications formats;
   in the plurality of communication interfaces, converting between the communications formats and an ATM format;
   in the analog telephony interface, communicating with a telephone that is located at the user location and that uses an analog telephony format;
   in the analog telephony interface, converting between the analog telephony format and the ATM format;

in the ADSL interface, communicating with the communications system using an ADSL with ATM over DSL format.

15. The method of claim 14 further comprising in the analog telephony interface, providing dial tone and power to the telephone.

16. The method of claim 14 further comprising in the analog telephony interface, detecting on-hook and off-hook conditions.

17. The method of claim 14 further comprising in the analog telephony interface, detecting dual tone multi-frequency (DTMF) tones.

18. The method of claim 14 further comprising in the analog telephony interface, providing echo cancellation.

19. The method of claim 14 further comprising in the analog telephony interface, forwarding control information to a service node in the communication system.

20. The method of claim 14 further comprising in a computer interface, converting between a computer format and the ATM format.

21. The method of claim 20 wherein the computer interface comprises an ethernet interface.

22. The method of claim 20 further comprising in the computer interface, routing a communication request from a computer to a service node in the communication system.

23. The method of claim 14 further comprising in a Java interface, receiving Java applets from the communication system.

24. The method of claim 14 further comprising in an ATM interface, exchanging ATM signaling between the end-user communication devices and the communication system.

25. The method of claim 14 further comprising in a MPEG interface, providing video signals to the end-user communication devices from the ATM format.

26. The method of claim 14 further comprising in a utility interface, collecting and forwarding metering information to the communication system.

* * * * *